United States Patent Office
3,431,211
Patented Mar. 4, 1969

3,431,211
AZEOTROPIC COMPOSITIONS

Albert W. Bauer, Wilmington, and Robert A. Gorski, Newark, Del., assignors to E. I. du Pont de Nemours and Company, Wilmington, Del., a corporation of Delaware
No Drawing. Filed Mar. 5, 1965, Ser. No. 437,541
U.S. Cl. 252—172 2 Claims
Int. Cl. C11d 7/50, 7/30

ABSTRACT OF THE DISCLOSURE

An azeotropic composition of 93–97% by weight of 1,1,2,2, - tetrachloro - 1,2 - difluoroethane and 7–3% by weight of n-heptane. The composition is useful for the solvent cleaning of complex electronic circuitry.

This invention is directed to novel cleaning solvent mixtures.

Solvent cleaning of complex electronic circuitry has become increasingly important. Printed circuits in television receivers, copying machines, and missile guidance systems are so intricate and compact that the only possible method of cleaning such circuits of foreign accumulations is to dip the circuits in a volatile organic solvent bath until the accumulations are dissolved, thereafter removing the circuits from the bath and allowing the residual solvent in the circuits to evaporate. In order to perform this unique service, the organic solvent must be low boiling, non-flammable, non-toxic and possess a high solvent power. The solvent must also perform its function without attacking or otherwise adversely affecting the operation of the electrical circuits.

Among the solvents useful in cleaning these delicate assemblies, 1,1,2,2 - tetrachloro - 1,2 - difluoroethane has received particular attention. This is due to its unique solvent characteristics. Tetrachlorodifluoroethane is a selective, non-flammable, non-explosive solvent having a desirable boiling point (92.79° C.) at atmospheric pressure. One drawback to tetrachlorodifluoroethane as a cleaning solvent, however, is its relatively high melting point (26° C.) which has limited the range of its usefulness and necessitated in many uses the installation and maintenance of heating equipment in order to keep the solvent liquid while it is performing in delicate electronic circuits. Even with such equipment the start-up of a cold, frozen cleaning bath is prolonged after a shutdown unless standby heaters are installed. The heaters then present maintenance problems and give rise to undue loss of solvent by evaporation.

Combining tetrachlorodifluoroethane with other organic liquids in order to lower the melting point of the solvent has not heretofore been successful, since its combination with other materials usually destroys one or more of the family of properties which make tetrachlorodifluoroethane such a useful solvent. Moreover, such mixtures usually fractionate on evaporation, making it difficult to recover the solvent mixture with the same composition as that in the original solvent bath.

It is, therefore, an object of this invention to provide a novel composition of 1,1,2,2-tetrachloro-1,2-difluoroethane which is liquid at normal temperatures and retains the non-flammable, selective solvency, and constant boiling properties of tetrachlorodifluoroethane.

This and other objects will become apparent from the following description and claims.

More specifically, the present invention is directed to a novel composition possessing azeotropic characteristics and consisting of from 93% to 97% by weight of 1,1,2,2-tetrachloro-1,2-difluoroethane and from 7% to 3% by weight of normal heptane. An azeotrope is a liquid mixture that exhibits a constant boiling point that may be higher or lower than the boiling points of the separate components. A feature of such a mixture is that its distillate has the same composition as the residue and no change in properties of the mixture or the distillate occurs as a result of evaporation. No method is known by which the existence of an azeotrope can be predicted.

The mixture of 1,1,2,2-tetrachloro-1,2-difluoroethane and n-heptane containing 3% to 7% by weight of n-heptane has essentially a constant boiling point. Moreover, being essentially constant boiling, the mixture does not tend to fractionate to any great extent upon evaporation. After evaporation, only a small difference exists between the composition of the vapor phase and the composition of the initial liquid phase. This difference is so small that the compositions of the vapor and liquid phases are considered essentially identical. Hence, any mixture within this defined range exhibits properties which are characteristic of a true binary azeotrope. The composition consisting of about 95% by weight of 1,1,2,2-tetrachloro-1,2-difluoroethane and about 5% by weight of n-heptane has been established, within the accuracy of the boiling point determination procedure, as the true binary azeotrope.

The above essentially constant boiling composition is also characterized by being liquid at normal room temperatures. The addition of small amounts of n-heptane has a marked effect on the lowering of the melting point of the tetrachlorodifluoroethane. For instance, 3% by weight of heptane lowers the melting point from 26.0° C. to 11.0° C.

The above-described azeotropic composition constitutes a real advance in the art since it provides a simple, economic way to convert a normally solid solvent, tetrachlorodifluoroethane, into a liquid without resorting to heating procedures and the maintenance of elevated temperatures to bring about and retain fluidity. At the same time, the significant useful properties of the single-component solvent, 1,1,2,2-tetrachloro-1,2-difluoroethane, are preserved—the selective solvent action, the constancy of composition on evaporation, the non-flammability, and freedom from explosion hazard. If changes of solvent composition during the cleaning operation and in the recovery of used solvent are to be prevented, it is absolutely essential that the solvent mixture possess azeotropic characteristics which will prevent its fractionation to an undesirable extent upon evaporation. A constant composition, and hence a constant cleaning solvent power, is an obvious necessity, not only in dip-tanks, but in vapor degreasing arrangements as well. In addition, the non-fractionating characteristics of the azeotropic mixture formed by the combination of tetrachlorodifluoroethane and n-heptane as heretofore described is most essential, since at no time should a cleaning solvent, either during evaporation in the cleaning apparatus, in handling procedures, or in recovery operations, be able to fractionate into a flammable or explosive composition.

The following representative examples illustrate the unique characteristics of the mixed solvents of the present invention. All parts are by weight unless otherwise specified.

EXAMPLE 1

To a flask equipped with condenser, dropping funnel and thermometer positioned such that the thermometer bulb lies wholly within the condensate stream was charged a weighed quantity of 1,1,2,2-tertachloro-1,2-difluoroethane. The contents were heated to reflux at a rate permitting the vapor to rise only to the middle of the first condenser bulb. There was added periodically to the flask a known quantity of n-heptane from the dropping funnel. After each addition sufficient time was allowed to establish equilibrium conditions before the boiling point was determined. The observed boiling point was then corrected to one atmosphere by the following formula:

$B.B._{corrected} = B.P._{observed} + 0.039$ (760—barometric pressure in mm. Hg)

The melting ponts of mixtures of n-heptane and 1,1,2,2-tetrachloro-1,2-difluoroethane were measured by cooling and rewarming the mixtures with agitation. The melting point was determined as that temperature at which the first visible crystals of solid appear or melt.

In the following table are shown the boiling temperatures and melting points for various proportions of n-heptane and 1,1,2,2-tetrachloro-1,2-difluoroethane and for the separate components. The constancy of the boiling point over the composition range of approximately 3 to 7 weight percent n-heptane indicates the presence of the minimum boiling point azeotrope and also illustrates the difficulty of establishing the composition of the true binary azeotrope.

TABLE I

| Wt. percent n-heptane | Boiling point, ° C. | Melting point, ° C. |
|---|---|---|
| 0 | 92.79 | 26.0 |
| 2 | 92.71 | 15.1 |
| 3 | 92.69 | 11.0 |
| 4 | 92.67 | 8.7 |
| 6 | 92.67 | 6.7 |
| 7 | 92.68 | 5.9 |
| 8 | 92.69 | 6.0 |
| 10 | 92.75 | 4.9 |
| 15 | 92.88 | 3.0 |
| 20 | 93.10 | 0 |
| 50 | 94.70 | −21 |
| 100 | 98.40 | −90 |

EXAMPLE 2

Mixtures of tetrachlorodifluoroethane and n-heptane were distilled through a 100 cm. column packed with glass helicies to provide a column equal to about 10 theoretical plates. After about 40% of a mixture had distilled, the distillate and residue were analyzed for n-heptane concentration. Table II gives the results of the analysis of the distillates and residues.

TABLE II.—CONTENT OF n-HEPTANE IN MIXTURE, PERCENT BY WEIGHT

| Initial mixture | Distillate | Residue |
|---|---|---|
| 2.0 | 2.9 | 1.4 |
| 3.0 | 3.6 | 2.6 |
| 4.0 | 4.4 | 3.8 |
| 6.0 | 5.8 | 6.1 |
| 7.0 | 6.4 | 7.4 |
| 8.0 | 6.9 | 8.7 |
| 25.0 | 17.1 | 30.9 |

The date in Table II confirm that the azeotropic mixture contains about 5 weight percent in n-heptane. In view of the fact that differences in the n-heptane content in the distillate and residue of about ±0.6 weight percent fall within the error of analysis, it is believed that the range of n-heptane concentrations which encompasses the azeotropic mixture is from approximately 3% to 7% by weight.

EXAMPLE 3

Flash point of solvent mixtures

Tests were made by the open-cup method (A.S.T.M. Method D-1310-63) for flash point on various compositions of the present invention. The specific composition employed and the results obtained are set forth in Table III below.

TABLE III

| n-Heptane | Tetrachlorodifluoroethane | Flash point, ° C. |
|---|---|---|
| 3.0 | 97.0 | (1) |
| 4.0 | 96.0 | (1) |
| 5.0 | 95.0 | (1) |
| 6.0 | 94.0 | (1) |
| 7.0 | 93.0 | (1) |
| 25.0 | 75.0 | 16.7 |

[1] None to the boiling point.

From the above, it can be seen that the compositions of the present invention are non-flammable.

It is to be understood that the preceding examples are representative and that said examples may be varied within the scope of the total specification, as understood by one skilled in the art, to produce essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. An azeotropic composition consisting of 93% to 97% by weight of 1,1,2,2-tetrachloro-1,2-difluoroethane and 7% to 3% by weight of n-heptane.

2. An azeotrope consisting of about 95% by weight of 1,1,2,2-tetrachloro-1,2-difluoroethane and about 5% by weight of n-heptane.

References Cited

UNITED STATES PATENTS

| | | | |
|---|---|---|---|
| 2,947,792 | 8/1960 | Skeeters | 260—652.5 |
| 2,999,816 | 9/1961 | Bennett et al. | 252—364 |
| 3,085,116 | 4/1963 | Kvalnes | 260—652.5 |
| 2,101,993 | 12/1937 | Fleischer | 252—67 |
| 2,511,993 | 6/1950 | Reed | 252—67 |
| 3,249,546 | 5/1966 | Eiseman | 252—67 |

OTHER REFERENCES

Gessler et al.: "New and Rapid Method for Isolating Viruses by Selective Fluorocarbon Deproteinization," Transactions of N.Y. Acad. Sci., Series 2, vol. 18, No. 8 (June 1956), pp. 701–704.

Mellan: Industrial Solvents (second edit.), Rheinhold Pub. Corp., New York (1950), p. 257 relied on.

Mellan: Industrial Solvents, Rheinhold Pub. Co., 1950, pp. 73 and 77.

LEON D. ROSDOL, *Primary Examiner.*

W. SCHULZ, *Assistant Examiner.*

U.S. Cl. X.R.

252—364; 260—652.5; 252—67